April 5, 1966  E. C. ARMENTROUT ETAL  3,243,835
BUSHING FOR ELECTRICAL LEAD
Filed April 18, 1963
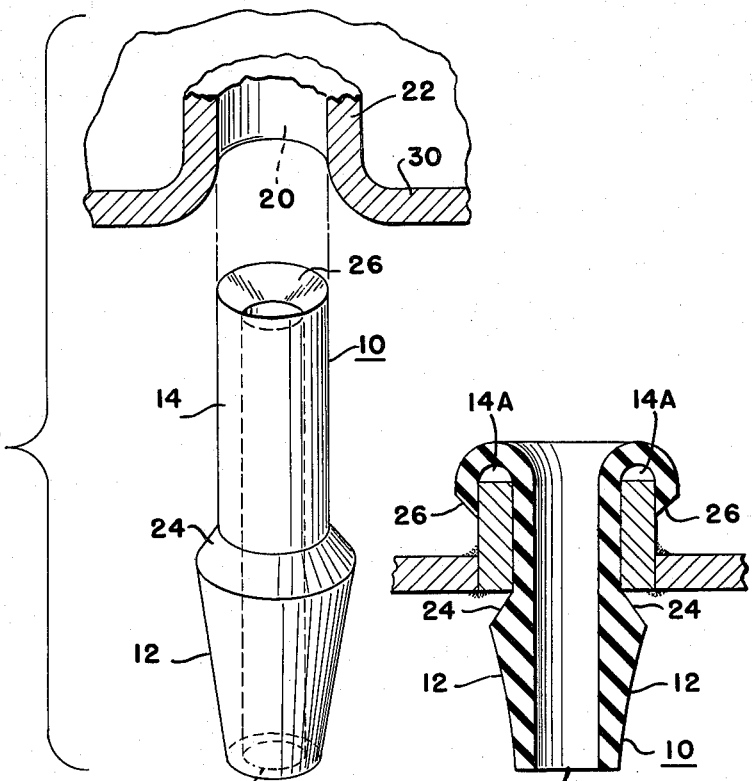
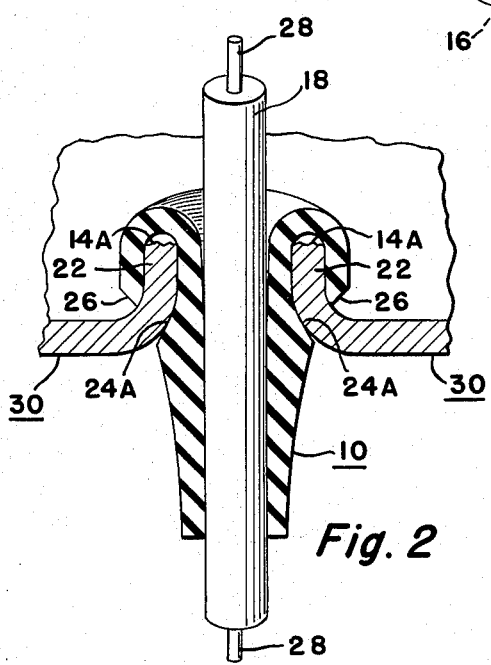
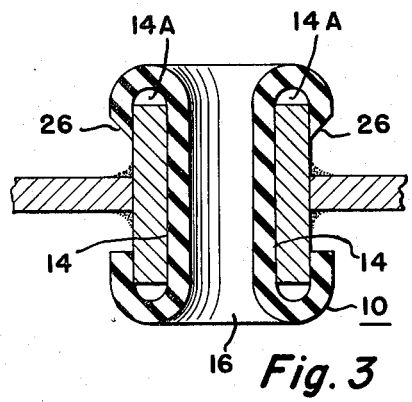
INVENTORS
Everett C. Armentrout
Jost S. Sucro
BY Edwin S. Dybvig
Their Attorney

United States Patent Office 3,243,835
Patented Apr. 5, 1966

3,243,835
BUSHING FOR ELECTRICAL LEAD
Everett C. Armentrout, New Carlisle, and Jost S. Sucro, Dayton, Ohio, assignors to General Motors Corporation, Detroit, Mich., a corporation of Delaware
Filed Apr. 18, 1963, Ser. No. 274,051
4 Claims. (Cl. 16—2)

This invention relates to fluid tight seals and more perticularly to a type of seal fitting around an electrical conduit that will render fluid tight the aperture through which the conduit passes.

At times in the manufacture of equipment having a fluid tight compartment, it becomes necessary to pass either electrical leads or conduits carrying liquids or gases through the wall of the compartment. Also, in the interests of economy of manufacturing such equipment, it is advantageous to be able to punch a hole for the access of conduits of the type described. One problem arising in this type of manufacture is that economy demands that the holes be punched rather rapidly and, in this manner of creating the hole, a rough edge is left. This rough or jagged edge of the hole in the material punched, whether the material be metal or plastic, creates a sealing problem at the point of entry of the conduit. It is possible to provide an expensively created aperture to enable proper sealing of the fluid tight compartment but, when economy makes this impractical, it is necessary to accept the moisture that can escape into this compartment or that can escape from this compartment around the point where the conduit enters. Another problem relating to the entry of a conduit into a water or moisture tight compartment is that an appropriate seal, if positive when created, precludes the practicality of breaking the seal, removing the conduit, performing maintenance work and, thereafter, replacing the conduit and remaking the seal.

It is an object of the present invention to provide a seal that will remain positive even though there are small variances in the size of the punched hole.

It is a further object of this invention to provide an inexpensive seal that can be easily installed and which will remain positive even though the edges of the access hole are irregular.

It is still a further object of the present invention to provide a seal that, once made, can be broken and remade with a good probability of making the seal as effective as it was when originally made.

Further objects and advantages of the present invention will be apparent from the following description, reference being had to the accompanying drawings wherein a preferred form of the invention is clearly shown.

In the drawing:

FIGURE 1 is an exploded perspective view of the invention;

FIGURE 2 is a perspective view with parts broken away illustrating the mounting of the invention in a punched access hole with a conduit in place;

FIGURE 3 illustrates an embodiment of this invention cooperating with a sleeve passing through an aperture;

FIGURE 4 illustrates an embodiment of this invention cooperating with a cylindrical sleeve extending from one side of an aperture.

Referring now to the drawing, FIGURE 1 illustrates a perspective view of the sealing bushing, generally designated by numeral 10. The sealing bushing is of any well-known resilient material, such as rubber, with a typical durometer rating of 30 to 40. Through the center of the body 12 and the sleeve portion 14 is an aperture 16, designed to be slightly smaller in diameter than the conduit 18 which is intended to pass through it. This smaller diameter allows the sealing bushing 10 to remain in firm engagement with the conduit 18 after the conduit is pushed into its mounting position.

In FIGURE 1 is also seen a typical wall or panel member 30 having a punched hole 20 with an extension 22 consisting of excess metal from the punching operation. In the normal punching operation, this excess metal 22 will sometimes take on a jagged form depending on the material used. Between the body 12 and the sleeve portion 14 is a tapered portion 24 which substantially reduces the diameter of the body to that of the sleeve. At the end of the sleeve portion 14 is an inwardly tapered portion 26. The tapered sleeve end 26 serves to provide a more perfect seal with the excess metal 22 during the sealing and also provides a free form lead-in from the tapered sleeve end 26 to the portion 22 of the punched hole as illustrated in FIGURE 2. The conduit 18 surrounding the electrical lead 28 can be of any non-conductive or insulating material. If a more positive seal is desired between the conduit 18 and the sealing bushing 10, the conduit 18 could be of a resilient material.

FIGURE 2 illustrates the conduit passing through a container wall, generally designated by the numeral 30. The main sealing areas of the operative structure are designated by the numerals 24A and 14A.

As an example of utility, an electrical lead passing through the wall of a fluid tight container will be used. Referring to FIGURE 2, the container wall 30 will be pierced by any impact type device to bring about an access port for the entry of an electrical lead. This piercing operation will leave a residue of excess metal, designated by the numeral 22. The sealing bushing 10 will be slipped around the electrical lead and the sleeve portion 14 fed into the aperture created in the piercing operation. The portion 14 will normally be of a slightly larger diameter than the pierced hole and will be fed into said hole until the tapered portion 24 makes contact with the container wall at point 24A. Next, the sleeve portion 14 will be folded back over the excess metal 22 and the normal resiliency of the sealing bushing will draw the tapered portion 24 more tightly against the container wall 30 at point 24A. Likewise, the folding over the sleeve portion 14 will cause extra pressure on the excess metal 22 at point 14A due to the normal resiliency of the sleeve portion 14 and the fact of its being stretched around the excess metal 22. The tapered portion 24 will thus, in effect, become a wedge between the container wall 30 and the conduit 18 as it passes through the sealing bushing and the folded over sleeve portion 14 will be the holding portion of the sealing bushing. Thus, the combination of the undersize sleeve, the wedging action at point 24A, and the overlapping seal at point 14A will render said passage fluid tight.

Referring to FIGURE 4 bushing 10 is illustrated as being inserted into a right angular shaped aperture similar to the aperture of FIGURE 3 but lacking the lower flange section. The cooperation of bushing 10 with the aperture is identical to that described in FIGURE 2 except that the sealing area 14A is illustrated as being smooth rather than being roughened by remaining metal left after a punching operation.

This invention has obvious utility in any operative environment that requires the entrance in a wall of a sealed container for a conduit carrying some other form of matter, when it is imperative that the matter sealed in the container does not come into contact with the material being carried in the conduit.

Another embodiment of this invention is shown in FIGURE 3 wherein a tubular portion is attached to the edges of an aperture, said aperture being for the passage of a conduit or a moving member. In this case, the invention can be used as a liner or as a guide and the tapered portion 24 will not be necessary as the other end of the sleeve acts as a holding portion in the same manner as the sleeve portion 14.

While the embodiment of the present invention, as herein disclosed, constitutes a preferred form, it is to be understood that other forms or designs might be adopted.

What is claimed is as follows:

1. A sealing bushing for a punched hole used as a conduit passage, comprising a resilient sleeve having a body, said body having a wall portion which is tapered along its longitudinal axis toward a maximum diameter point and then reversely tapered down to an elongated tubular portion of constant diameter, said body and tubular portion having a centrally located aperture for the reception of a conduit, said aperture being of slightly smaller diameter than the conduit to effect positive engagement therewith upon insertion of said conduit into the aperture, said reversely tapering portion of the body bearing on the entrance side of said punched hole and the elongated tubular portion passing through said punched hole and being disposed to fold back over the excess metal on the exit side of the punched hole thereby causing a positive seal therewith, and due to inherent resiliency drawing the reversely tapered portion of said body more firmly against the entrance side of said punched hole, said conduit passage being thereby rendered impervious to the casual passage of fluids or foreign matter.

2. In combination, a panel provided with an aperture of substantially circular shape having a cylindrical extension therefrom, and a sealing bushing comprising a resilient sleeve for lining said aperture, said resilient sleeve having a tubular end adapted to pass through and fold over said cylindrical extension thereby firmly holding said resilient sleeve in contact with said extension, said sleeve having a tapered outer periphery arranged to wedge into the aperture and be held by said resilient sleeve as it folds over the cylindrical extension, said resilient sleeve having a centrally disposed orifice to receive said elongated member and maintain it in sealing engagement with said cylindrical extension.

3. A sealing bushing for a punched hole used as a conduit passage, said sealing bushing comprising: a resilient sleeve including a body portion which is tapered along its longitudinal axis towards a maximum diameter point and then reversely tapering down to an elongated tubular portion of constant diameter; and a tubular portion of constant diameter having a substantially constant diameter extending from the tapered wall portion in the opposite direction from said first mentioned tubular portion, said second mentioned tubular portion having an end with a tapered opening extending inwardly and terminating in an aperture extending through said body, said body being insertable into the punched hole used as a conduit passage and foldable over excess metal disposed therearound and allowed to firmly resiliently engage the outer portion of the excess metal due to the inwardly tapered end allowing foldable freedom to the second mentioned constant diameter portion.

4. A combination of a panel having an aperture therein lined by a substantially cylindrical tubular member, and a sealing bushing according to claim 3 wherein the reversely tapered portion provides a wedging means against the juncture of the panel and the substantially tubular lining member and the second mentioned constant diameter portion folds over an exposed portion of the substantially cylindrical lining member firmly resiliently gripping an outer diameter thereof, the gripping of the outer diameter thereof being facilitated by the inwardly tapered portion of the second mentioned constant diameter portion.

References Cited by the Examiner

UNITED STATES PATENTS

| 2,169,967 | 8/1939 | Smith | 174—152 |
| 2,225,472 | 12/1940 | Franklin | 16—2 |
| 2,772,034 | 11/1956 | Richmond | 16—2 |
| 2,806,080 | 9/1957 | Corey. | |
| 2,944,325 | 7/1960 | Clark | 174—152 X |

FOREIGN PATENTS

| 700,044 | 12/1940 | Germany. |

JOSEPH D. SEERS, Primary Examiner.

DONLEY J. STOCKING, Examiner.